May 30, 1950     H. H. PACKWOOD     2,509,936
LAWN MOWER
Filed Sept. 28, 1946
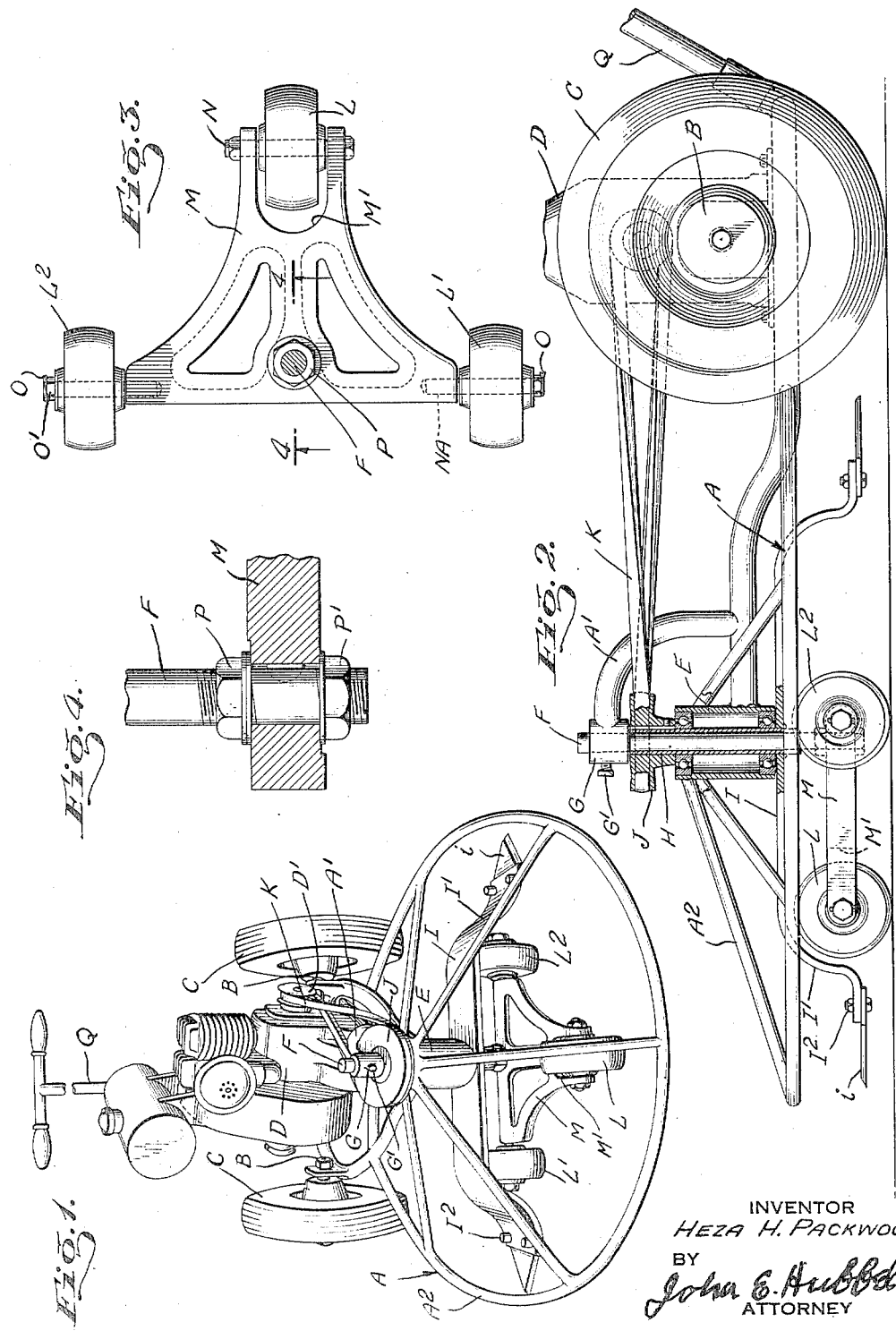
INVENTOR
HEZA H. PACKWOOD
BY
John E. Hubbell
ATTORNEY Patented May 30, 1950

2,509,936

UNITED STATES PATENT OFFICE 2,509,936

LAWN MOWER

Heza H. Packwood, Baton Rouge, La.

Application September 28, 1946, Serial No. 699,956

1 Claim. (Cl. 56—25.4)

The general object of the present invention is to provide an improved lawn mower of the type disclosed in my prior Patent No. 2,287,126, granted June 23, 1942, and, in particular, to provide the lawn mower with an improved front roller ground engaging element.

The type of lawn mower disclosed in my prior patent is characterized by the rotation of its grass cutter about a vertical axis, and by the formation of the cutter structure so that it extends over and surrounds a front roller ground engaging element. The cutter structure consists essentially of an upper central horizontally extending section and depending outer sections with horizontal outwardly extending cutter blades attached to the lower ends of said outer sections. The rotating cutter structure thus defines a flattened domelike space in which the front ground engaging element is located. That element is connected to the main lawn mower framework by a post or shaft extending through the central upper portion of the rotary cutter.

In the form shown in my prior patent, the front ground engaging element comprises a single elongated roller rotating about a horizontal axis transverse to the general direction of the lawn mower movement over the ground. The front roller of my prior patent is located in front of the vertical axis of the cutter to prevent the cutter blades from engaging and digging into the ground, and is elongated to increase the stability of the lawn mower, and, in particular, to restrict the tendency of the lawn mower to rock about the longitudinal axis of the lawn mower when the latter is running over ground having local irregularities such as occur in most lawns. Need for the stabilizing or anti-rocking action of the front ground engaging element is accentuated by the relatively high center of gravity of the lawn mower when the latter includes an internal combustion engine.

A primary and practically important object of the present invention is to provide a lawn mower of the above mentioned type with a front rolling ground engaging element which will give better protection against the risk of the cutting blades digging into the ground, and a more effective lawn mower stabilizing or anti-rocking capacity than are conjointly obtainable with the single front ground engaging roller of my prior patent. Another specific object of the invention is to provide a front rolling ground engaging element which will make the variations in height of cut above the general ground level caused by small local irregularities in the ground surface smaller than those resulting from such irregularities when the front ground engaging element is a single roller.

For the attainment of the foregoing objects, I provide an improved front ground engaging element characterized by its inclusion of three narrow ground engaging rollers or wheels, and by the location of one of said wheels directly in front of and at a substantial distance from the cutter axis, and by the location of the other two wheels at opposite sides of the cutter axis and adjacent the periphery of the space defined by the rotating cutter structure. In the preferred form of the invention, the front wheel is substantially as far in front of the cutter axis as the necessity for providing proper clearance between that roller and the cutter structure will permit, and each of the other two wheels is located adjacent, and slightly to the rear of, the plane including the cutter axis and transverse to the direction of lawn mower movement over the ground, and about as close to the periphery of said space as clearance requirements will permit.

The described arrangement of the three front ground engaging wheels permits the attainment of substantially the maximum protection against digging and rocking actions obtainable in a lawn mower of given dimensions. Furthermore, the displacement of the three ground engaging front rollers of the present invention both longitudinally of and transversely to the direction of lawn mower movement, reduces the variations in the height of cut which local irregularities in the ground surface tend to produce. Moreover, the replacement of the single elongated roller of my prior patent, by three wheels or narrow rollers having an aggregate axial length substantially smaller than the length of the single prior roller, reduces the frictional resistance to the movement of the lawn mower over the ground.

The various features of novelty which characterize my invention are pointed out with particularity in the claim annexed to and forming a part of this specification. For a better understanding of the invention, however, its advantages, and specific objects attained with its use, reference should be had to the accompanying drawing and descriptive matter in which I have illustrated and described a preferred embodiment of the invention.

Of the drawings:

Fig. 1 is a perspective view of my improved lawn mower;

Fig. 2 is a side elevation of my lawn mower with some upper portions broken away;

Fig. 3 is a plan view of the front roller structure of the lawn mower, and

Fig. 4 is a section on the line 4—4 of Fig. 3.

The lawn mower structure shown in the drawings comprises a main frame A connected to and having its rear portion supported by the axles B on which the rear ground engaging wheels C are mounted. The latter may be provided with rubber tires of conventional type and support the bulk of the weight of the lawn mower. The cutter driving motor D ordinarily, and as shown, is an internal combustion engine mounted on the framework A with its center of gravity above and adjacent the vertical plane including the axes of rotation of the wheels C. The framework A includes an uprising hollow cylindrical portion E at some distance in front of the wheels C. A nonrotatable post F extends axially through the hollow cylindrical part E, and above the latter is rigidly secured in a tubular framework part G which is coaxial with the hollow cylinder E and is supported by a gooseneck portion A' of the main frame. Advantageously the post F and frame part G have a spline connection which prevents rotative movement of the post in the frame part G but permits the longitudinal adjustment of the parts. The latter is releasably secured in place by a set screw G'.

A tubular shaft H surrounding the post F, is journaled in the frame part E for rotation about a vertical axis. The lower end of the shaft H is connected to the upper central portion of the rotating grass cutter structure I and supports and rotates said structure. The upper end of the tubular shaft H is secured to a coaxial pulley J. The latter is interposed between the frame parts E and G, and is rotated by the motor D through a belt K running over a driving pulley D', secured to the shaft of the motor D. The cutter structure I, in the form shown, is a metal bar having an upper horizontally extending body portion and depending end portions I', to each of which a flat horizontally extending cutting blade i is secured by means of clamping bolts I². Insofar as above described, the lawn mower shown in the drawing does not differ in substance, though it does differ somewhat in form, from the lawn mower shown in my said prior patent. The lawn mower frame A comprises a guard portion A² slightly above and extending radially slightly to the outer side of the circle along which the outer ends of the cutting blades i move.

The improved front roller ground engaging element disclosed herein comprises three wheels or short rollers L, L' and L² mounted in a horizontally extending frame member M. The latter is rigidly secured to the lower end of the post F. In the particular form shown, the frame M is of triangular shape with its front apex portion cut away to form a slot M' which receives the front roller L. The latter is journaled on a shaft N which extends through the sidewalls of the slot M'. As shown, the shaft N is in the form of a bolt with a head at one end and having a nut threaded on its other end. At the opposite ends of what may be regarded as the base portion of the triangular frame, the latter is provided with horizontal coaxial spindle extensions NA, one of which supports the wheel L' while the other supports the wheel L². As shown, each spindle NA has an inner end portion anchored in the frame M and is provided at its outer end with a passage for a cotter pin O, which, in conjunction with the adjacent member O' holds the corresponding wheel L' or L² in place. As shown, the post F passes through the body of the supporting frame M and is splined or keyed to the latter, and has upper and lower clamping nuts P and P' threaded on its lower portion. Ordinarily, and as shown, non-slip washers are interposed between the clamping nuts P and P' and the adjacent sides of the member M.

The wheels or rollers L, L' and L² and the roller supporting the frame M are so formed and proportioned that in the regular operation of the lawn mower running over a normally smooth ground surface, a portion of the lawn mower weight will normally be supported by each of the three front rollers L, L' and L², although I advantageously so shape and arrange the different wheels that if the lawn mower were resting on a smooth unyielding surface, the front roller L and the main wheels C would hold the rollers L' and L² a sixteenth of an inch or so above the supporting surface.

In operation, the lawn mower is manually moved over the ground and is guided in its movements through a lawn mower handle Q suitably attached to the rear portion of lawn mower frame and shown as of conventional form. The location of the driving motor D with its center of gravity adjacent and preferably slightly to the rear of the vertical plane including the axes of the rear wheel C, makes it possible for the operator to readily tilt the lawn mower frame about the common axis of the rear wheels C to facilitate changes in direction of lawnmower movement or to raise the cutter structure when conditions make its elevation desirable.

In its normal operation, a portion of the lawn mower weight is supported by the front ground engaging element, and in mowing a relatively smooth lawn or grass plot, some of the lawn mower weight is normally supported by each of the three front rollers L, L' and L². It is an important practical advantage of the invention, however, that when any one of those rollers moves over a depression, the normal level of cut may be maintained by the other two. When one only of the three front rollers moves over a local ground elevation, it tends to raise the cutting level, but with narrow front rollers, as shown, the effect on the cutting level of the engagement of a small local ground elevation by one only of the front wheels, is usually small. As shown, the leading front roller L is about as far in front of the cutter axis as is practically feasible, and hence is in about the best possible position to minimize the tendency of the blades i to dig into the ground when the ground surface is irregular. As will be apparent, also, the lateral displacement from one another of the two rollers L' and L² is about the maximum possible, and thus provides about the maximum obtainable stabilizing or anti-rocking action of the front rolling ground engagement element of the lawn mower.

While the present invention is obviously usable in lawn mowers having different dimensions and proportions, it is noted by way of illustration and example, that in one lawn mower of commercial type and size which includes a front ground engaging element of the precise form shown in Figs. 2, 3 and 4, the front rollers are 3 inches in diameter and the distance between the outer sides of the rollers L' and L² is approximately 11 inches, and the axis of the front roller L is slightly more than 5 inches away from the axis of the post F. In a lawn mower of the same general dimensions, which includes a single elongated front roller as shown in my prior patent, the roller is 7 inches long and its axis is less than four inches in front of the axis of the post F. The dimensions just stated are indicative of the advantages possessed by the improved lawn mower in respect to protection against digging in, and to lateral stability.

While in accordance with the provisions of the statutes, I have illustrated and described the best form of embodiment of my invention now known to me, it will be apparent to those skilled in the art that changes may be made in the form of the apparatus disclosed without departing from the spirit of my invention, as set forth in the appended claim, and that in some cases certain features of my invention may be used to advantage without a corresponding use of other features.

Having now described my invention, what I claim as new and desire to secure by Letters Patent is:

In a lawn mower of the known type comprising a framework including a vertically disposed tubular part in its front portion, a tubular shaft extending through said tubular part and mounted therein for rotation about a vertical axis, a cutter structure connected to the lower end of said shaft and comprising an upper section, an outwardly extending lower cutting blade section and a depending intermediate section horizontally displaced from said vertical axis extending between and rigidly connected to each of the first mentioned sections, whereby when said shaft is rotated, said intermediate cutter section rotates about and defines the periphery of a front wheel receiving space beneath said upper section, a cutter driving motor mounted on said framework and connected to and rotating said shaft, and rolling ground engaging means connected to and supporting said framework and comprising ground engaging roller means rotatably connected to said framework at the rear of said tubular part, the improvement comprising three ground engaging wheels and a wheel supporting frame located within said space, said wheels being pivotally connected to said frame to turn about substantially parallel axes, and an uprising post rigidly connected at its lower end to said frame and extending upward through said hollow shaft and having its upper end secured to said framework, one of said wheels being located in front of said axis and adjacent the periphery of said space, and the other two wheels being located at opposite sides of said vertical axis and adjacent the periphery of said space, with their axes parallel to and adjacent a plane including said vertical axis.

HEZA H. PACKWOOD.

REFERENCES CITED

The following references are of record in the file of this patent:

UNITED STATES PATENTS

| Number | Name | Date |
| --- | --- | --- |
| 953,862 | Schedin | Apr. 5, 1910 |
| 2,287,126 | Packwood | June 23, 1942 |
| 2,390,321 | Packwood | Dec. 4, 1945 |